United States Patent [19]

Johnson

[11] Patent Number: 4,788,903

[45] Date of Patent: Dec. 6, 1988

[54] MOTOR VEHICLE AIR MANAGEMENT SYSTEM

[75] Inventor: George H. Johnson, Newfane, N.Y.

[73] Assignee: General Motors Corporation, Detroit, Mich.

[21] Appl. No.: 912,416

[22] Filed: Sep. 29, 1986

[51] Int. Cl.$^4$ .............................................. B60H 1/26
[52] U.S. Cl. ........................................ 98/1.5; 98/2.01; 98/2.18
[58] Field of Search ............... 98/1.5, 2, 2.01, 2.16, 98/2.17, 2.18

[56] References Cited

U.S. PATENT DOCUMENTS

| | | | |
|---|---|---|---|
| 2,451,278 | 10/1948 | Cruzan | 98/1.5 |
| 2,463,491 | 3/1949 | Kemper | 98/1.5 |
| 2,485,113 | 10/1949 | Roth et al. | 98/1.5 |
| 2,578,539 | 12/1951 | Green | 98/1.5 |
| 3,392,654 | 7/1968 | Grenier | 98/2.01 |
| 3,672,718 | 6/1972 | Broyer | 296/15 |
| 3,750,555 | 8/1973 | Götz | 98/2.01 |
| 4,102,548 | 7/1978 | Kangas | 296/15 |
| 4,235,298 | 11/1980 | Sackett et al. | 180/54 A |
| 4,283,067 | 8/1981 | Weber et al. | 280/5 A |
| 4,384,630 | 5/1983 | Steiner | 180/7.1 |
| 4,460,055 | 7/1984 | Steiner | 180/7.1 |
| 4,460,213 | 7/1984 | Janssen et al. | 296/15 |

FOREIGN PATENT DOCUMENTS

| | | | |
|---|---|---|---|
| 82672 | 7/1981 | Japan | 296/15 |
| 1151486 | 4/1985 | U.S.S.R. | 98/2.14 |

OTHER PUBLICATIONS

"Fastback, Holdback, or Cute Styling?", *Popular Science*, Jun. 1966, pp. 94–98 and 198.

*Primary Examiner*—Harold Joyce
*Attorney, Agent, or Firm*—R. L. Phillips

[57] ABSTRACT

A motor vehicle passenger compartment has an air inlet at the base of the windshield and a valve controlling an air outlet so as to maintain the pressure in the compartment above ambient pressure.

2 Claims, 1 Drawing Sheet

U.S. Patent   Dec. 6, 1988   4,788,903
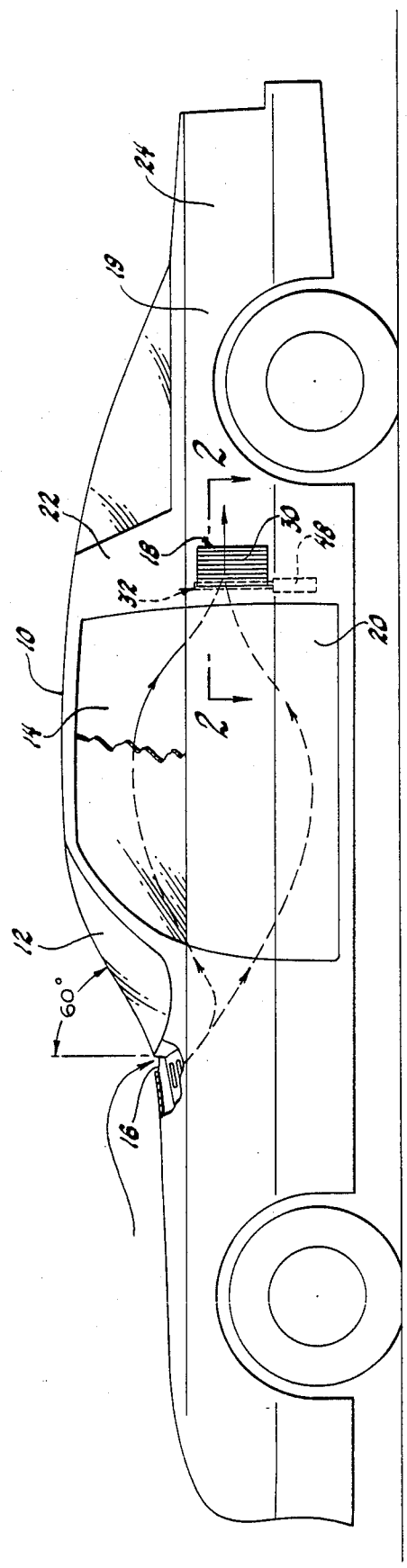
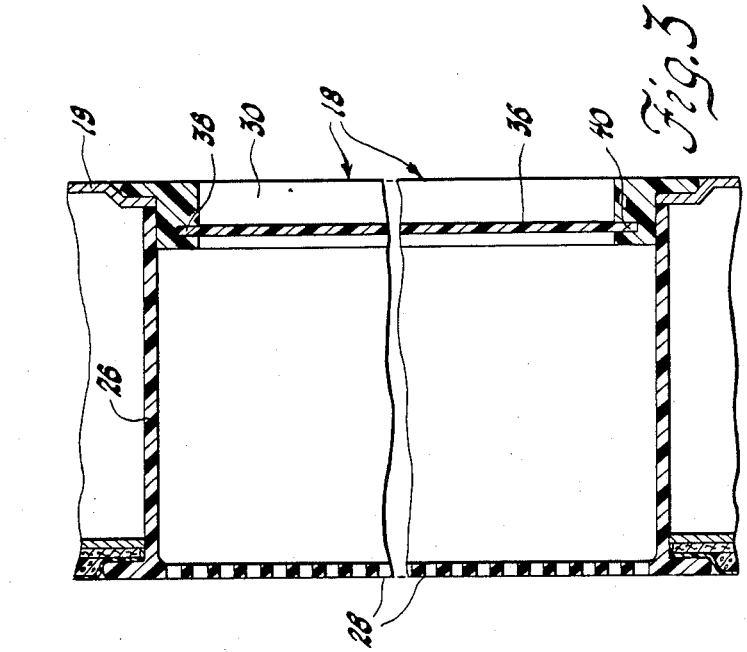
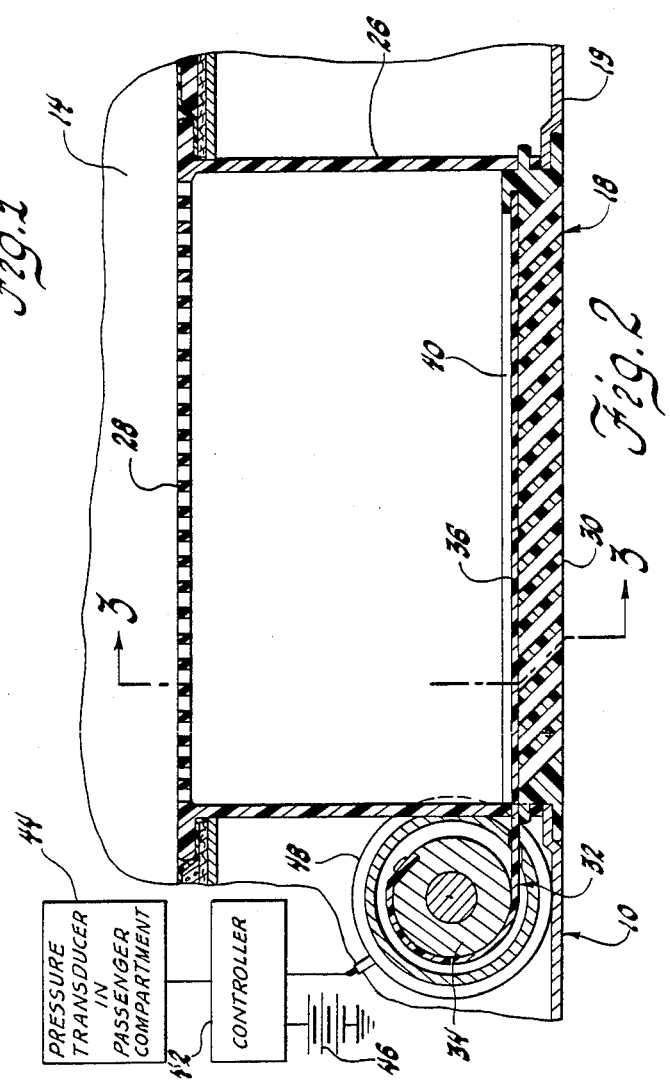

MOTOR VEHICLE AIR MANAGEMENT SYSTEM

TECHNICAL FIELD

This invention relates to motor vehicle air management systems and more particularly to the control of pressure in and airflow through the passenger compartment.

BACKGROUND OF THE INVENTION

With the greater emphasis on motor vehicle aerodynamics to improve fuel economy and also styling, the angle of the windshield measured from vertical has been increasing resulting in the airflow over the hood increasing and the positive pressure at the base of the windshield decreasing. While this benefits the vehicle by reducing the drag coefficient, the reduction in static pressure at those passenger compartment air inlets located at the base of the windshield results in reduced airflow into the compartment since the driving force therefor is the pressure differential between the air entry and exit. For example, it has been found that the pressure at such a located air inlet decreases about 2% for every degree of change in the windshield angle in the currently desired range from 45° to 60° resulting in significant incremental reductions in air inflow.

The pressure differential can be adjusted to compensate for reduced inlet pressure by locating the outlet in a high negative (subatmospheric) pressure area such as the rear region of the rear quarter panel but this can cause negative pressures to develop in the passenger compartment under some driving conditions. And this negative compartment pressure is an undesirable effect since it may cause airflow of unconditioned ambient air into the compartment through any leakage passages such as an unseated door or window seal resulting in possibly discomforting cold or hot air drafts.

SUMMARY OF THE INVENTION

The present invention is directed to providing a slightly positive compartment pressure of about 0.1-0.2 psi above ambient which has been found to be ideal for all driving conditions. The advantages that result are many in that with substantially no compartment pressure to work against, adequate airflow into the compartment through the inlet can be maintained with increases in windshield angle while assuring outflow in all driving conditions without drafts of ambient air. Furthermore, there results improved compartment air circulation, reduced air whistling, and tobacco smoke removal without the noise or possible discomfort of open windows.

The present invention accomplishes this with an active or automatic passenger compartment air management system comprising a valve that is operable to vary the area of an outlet that is preferably located in the most negative pressure area of the vehicle body such as the sail panel, just aft of a single door or rear door as the case may be, or in the rear region of the rear quarter panel. A pressure responsive controller senses the compartment pressure relative to ambient and controls the air outlet valve to adjust the outlet opening so as to maintain the compartment at the desired slightly positive pressure to thereby assure the desired inflow of ambient air under all driving conditions.

DETAILED DESCRIPTION OF PREFERRED EMBODIMENT

These and other objects, features and advantages of the present invention will become more apparent from the following description and drawing in which:

FIG. 1 is a side view with parts broken away of a motor vehicle with the preferred embodiment of the active passenger compartment air management system according to the present invention.

FIG. 2 is an enlarged view taken along the line 2—2 in FIG. 1 and includes a schematic of the valve control.

FIG. 3 is a view taken along the line 3—3 in FIG. 2.

Referring to the drawing wherein the same numbers are used to identify the same parts throughout the several views, there is shown a motor vehicle having a two-door passenger body 10 with a sloped windshield 12 at an angle of 60° from vertical. The body encloses a passenger compartment 14 whose air needs are served by a heating, air conditioning and ventilating system having one or more air inlets 16 at the base of the windshield and an air outlet 18 strategically located in the rear quarter panel 19 just aft of each door 20 as described in more detail later. The heating, air conditioning and ventilation components for conditioning and directing the ambient air received at the inlets are conventional and are therefore not shown.

The air outlets 18 (only the left vehicle side one being shown) are located to open the passenger compartment to the outside in a body area where the outside pressure during vehicle motion is most negative which may be just aft of the door as shown but depending on the body aerodynamics might be at the sail panel 22 or in the rear region 24 of the rear quarter panel. The air outlet 18 is formed by a frame 26 that fits and is adapted to be retained in an opening through the body in the rear of the passenger compartment and has both an interior grill 28 and exterior grill 30. A roll type door or valve 32 is mounted in the frame 26 having a vertical spool 34 on which a flexible window shade type valve member 36 is adapted to wind and unwind while sliding in a horizontal track 38 and 40 formed in the exterior grill above and below the opening through the frame so as to adjust the size of this opening.

The valve 32 is controlled by an electronic controller 42 that senses compartment pressure with a pressure transducer 44 and sends electric power from the vehicle battery 46 to an electric motor actuator 48 to operate the movable valve member 36. The controller incudes a computer of conventional design that is programmed to measure the compartment pressure relative to the ambient or outside air and control the air outlet valves to adjust their opening so as to maintain the compartment pressure sightly positive (e.g. about 0.1-0.2 psi above ambient). It will also be appreciated that other forms of valve actuators may be employed such a vacuum actuator in which case a pressure sensing mechanism such as a sealed evacuated bellows could be utilized that is responsive to compartment pressure relative to ambient and opens or closes vacuum and atmospheric communication with the vacuum actuator to adjust the air outlet valve. Furthermore, there may be only one air outlet valve that is strategically located depending on the circulation desired.

The above described embodiments are illustrative of the invention which may be modified within the scope of the appended claims.

The embodiments of the invention in which an exclusive property or privilege is claimed are defined as follows:

1. In a motor vehicle having a passenger compartment with an air inlet at a positive pressure area on the vehicle and an air outlet at a negative pressure area on the vehicle wherein there occurs a pressure differential during vehicle movement that forces air to flow into the inlet through the passenger compartment and out the outlet and that can also force air to flow into the compartment through a leakage path on the vehicle, the improvement comprising valve means for varying the area of said outlet, and pressure responsive control means responsive to the pressure in said compartment for controlling said valve means so as to maintain the pressure in said compartment above ambient pressure to prevent entry of ambient air into said compartment through said leakage path.

2. In a motor vehicle having a passenger compartment with an air inlet at the base of a windshield in a positive pressure area on the vehicle and an air outlet at a negative pressure area on the vehicle wherein there occurs a pressure differential during vehicle movement that forces ambient air to flow into the inlet through the passenger compartment and out the outlet and that can also force air to flow into the compartment through a leakage path on the vehicle, the improvement comprising said outlet being located at the most negative pressure area on the vehicle, valve means for varying the area of said outlet, and pressure responsive control means responsive to the pressure in said compartment for controlling said valve means so as to maintain the pressure in said compartment above ambient pressure to prevent entry of ambient air into said compartment through said leakage path.

* * * * *